(12) United States Patent
Perkins et al.

(10) Patent No.: US 7,149,806 B2
(45) Date of Patent: Dec. 12, 2006

(54) DATA ACCESS IN A DISTRIBUTED ENVIRONMENT

(75) Inventors: Gregory Eugene Perkins, Boise, ID (US); Patrick O'Neil Sandfort, Meridian, ID (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 719 days.

(21) Appl. No.: 10/085,971

(22) Filed: Feb. 27, 2002

(65) Prior Publication Data

US 2003/0163566 A1  Aug. 28, 2003

(51) Int. Cl.
*G06F 15/16* (2006.01)

(52) U.S. Cl. ............... 709/229; 709/203; 709/217; 709/219; 709/225; 709/226

(58) Field of Classification Search ............ 709/225, 709/229, 232; 713/200
See application file for complete search history.

(56) References Cited

U.S. PATENT DOCUMENTS

| | | | | |
|---|---|---|---|---|
| 6,055,637 | A * | 4/2000 | Hudson et al. | 713/201 |
| 6,067,623 | A * | 5/2000 | Blakley et al. | 726/5 |
| 6,088,451 | A * | 7/2000 | He et al. | 726/8 |
| 6,182,142 | B1 * | 1/2001 | Win et al. | 709/229 |
| 6,199,113 | B1 * | 3/2001 | Alegre et al. | 709/229 |
| 6,324,648 | B1 * | 11/2001 | Grantges, Jr. | 726/12 |
| 6,453,353 | B1 * | 9/2002 | Win et al. | 709/229 |
| 6,463,474 | B1 * | 10/2002 | Fuh et al. | 709/225 |
| 6,490,624 | B1 * | 12/2002 | Sampson et al. | 709/227 |
| 6,505,230 | B1 * | 1/2003 | Mohan et al. | 709/202 |
| 6,539,481 | B1 * | 3/2003 | Takahashi et al. | 713/201 |
| 6,668,322 | B1 * | 12/2003 | Wood et al. | 713/182 |
| 6,691,232 | B1 * | 2/2004 | Wood et al. | 726/6 |
| 6,728,884 | B1 * | 4/2004 | Lim | 726/12 |
| 7,080,077 | B1 * | 7/2006 | Ramamurthy et al. | 707/9 |
| 2002/0010679 | A1 * | 1/2002 | Felsher | 705/51 |
| 2002/0049717 | A1 * | 4/2002 | Routtenberg et al. | 707/1 |
| 2002/0091798 | A1 * | 7/2002 | Joshi et al. | 709/219 |
| 2003/0061275 | A1 * | 3/2003 | Brown et al. | 709/203 |

OTHER PUBLICATIONS

Curtin, Mark, "A Failure to Communicate: When a Privacy Seal Doesn't Help", www.interhack.net/pubs/truste-web-bug.*

* cited by examiner

*Primary Examiner*—Bunjob Jaroenchonwanit
*Assistant Examiner*—Dohm Chankong

(57) ABSTRACT

A method and system for providing a first network resource limited access to a second network resource. A method embodying the invention includes receiving profile data. Using the profile data, temporary credentials are then generated for accessing the second network resource. The temporary credentials are then made available to the first network resource. In a preferred embodiment, the temporary credentials are invalidated following a termination event such as the lapse of a set time period or after the second resource has been accessed.

52 Claims, 5 Drawing Sheets

DATA ACCESS IN A DISTRIBUTED ENVIRONMENT

FIELD OF THE INVENTION

The present invention is directed to a method and system for data access. More particularly, the invention is directed to a method and system for locating and accessing user data in a distributed environment.

BACKGROUND OF THE INVENTION

In a basic desktop computing environment, a computer, accessing data from its hard drive, performs a specified function such as word processing, displaying information on a screen, and, when requested, producing a document on a connected printer. In a distributed computing environment, the resources found in the desktop environment are spread across any number of interconnected devices. For example, a client accesses resource over the Internet. Accessing data provided by the client or located and retrieved from another device, the resource performs specified tasks. These tasks include manipulating the data as instructed, returning the data for use by the client, and/or sending data to a printer for production.

The following provides a more specific example of a distributed computing system utilized to print documents. A client computer, utilizing a web browser and the Internet, accesses a web server providing a document printing resource. The web server may be running on a device connected to or networked with one or more printers, alternatively the web server may be embedded in the printer itself. The printing resource locates available web enabled printers and a data resource managing electronic documents. The printing service then returns to the browser a graphical interface containing user accessible controls for selecting a document from the data resource as well as controls for selecting a printer. Selections made through the interface are returned to the printing resource. Accessing the data resource, the printing resource retrieves and/or sends the selected document to the selected printer for production.

A given data resource often functions as a personal repository for any number of users. The documents each user stores on the data server are segregated into data stores. For security reasons, the data server allows access to a data store only after a user supplies verifiable credentials such as a user name and a password. To provide a print resource access to a data resource with minimal user interaction, a client such as a browser is extended with additional programming enabling the browser to locate the user's data store. Developing and distributing the additional programming is relatively inefficient and can be expensive.

Moreover, conventional approaches fail to maintain a user's privacy. Without additional limitations, after a user provides credentials to a third party to access a given resource, the user relinquishes a significant amount of control. The third party, acting improperly, may continue to access the data resource without the user's consent or knowledge. Moreover, the third party can use the credentials to monitor the activities of the user.

SUMMARY OF THE INVENTION

Accordingly, the present invention is directed to a method and system for providing a first network resource limited access to a second network resource. A method embodying the invention includes receiving profile data. Using the profile data, temporary credentials are then generated for accessing the second network resource. The temporary credentials are then made available to the first network resource. In a preferred embodiment, the temporary credentials are invalidated following a termination event such as the lapse of a set time period or after the second resource has been accessed.

DETAILED DESCRIPTION OF THE INVENTION

Figure 1:
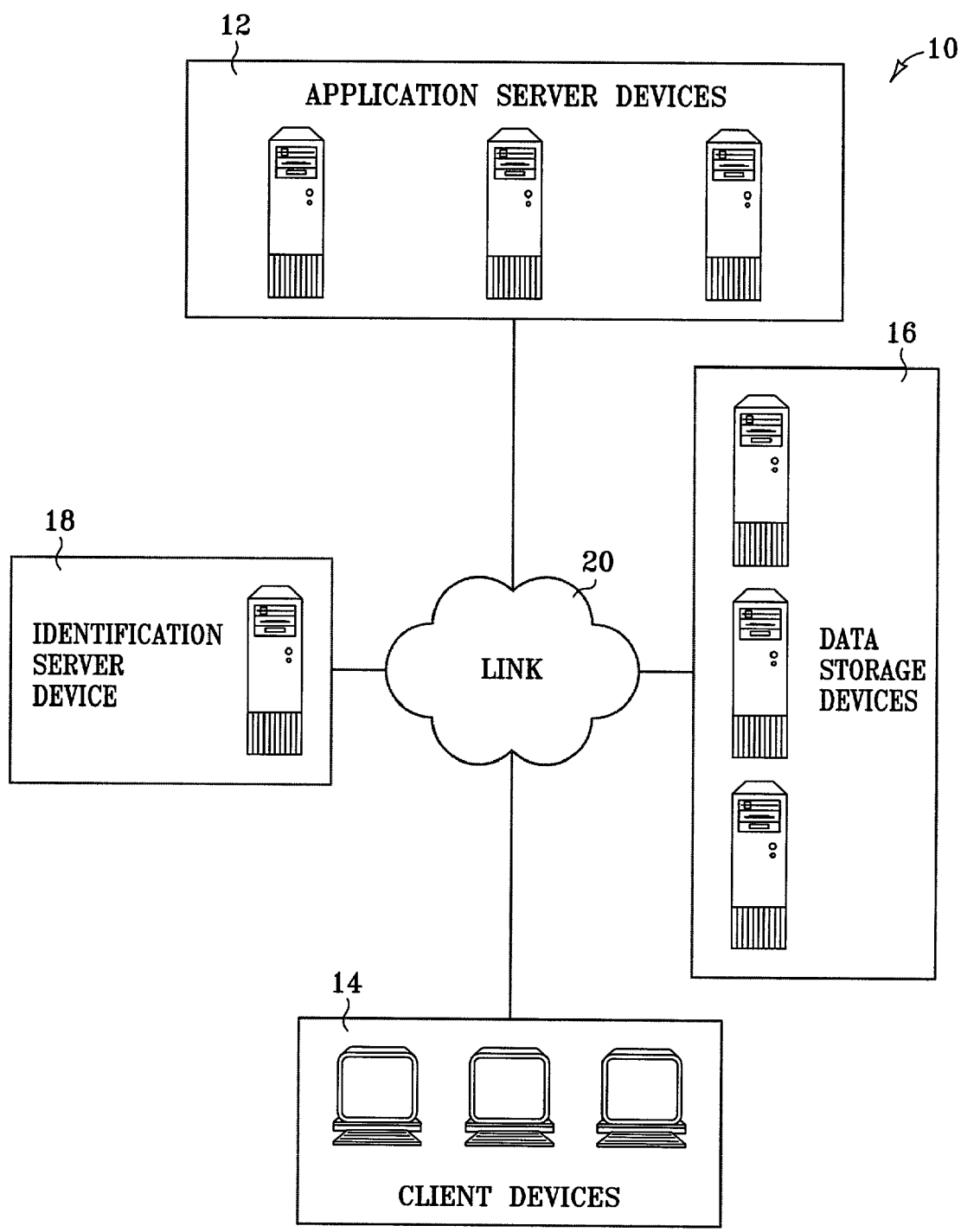
FIG. 1 is a schematic representation of a computer network in which various embodiments of the present invention may be incorporated.

Glossary:

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client-Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning requested information, if any, back to the client. This requested information may be an electronic file such as a word processing document or spreadsheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (eXtensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP, such as SOAP (Simple Object Access Protocol).

Data Store: A logical memory area for storing electronic files such as word processor documents, spreadsheets, electronic images such as digital photographs, digital audio and video recordings, computer programs, device drivers, text messages, and any other electronic data. A data store may consist of a single folder located on a media source such as a hard drive, compact flash card, CD ROM, random access memory, or any other structure or mechanism for temporarily or permanently storing electronic data. A data store may consist of multiple folders on a single source or it may include an entire media source. A data store may even span across multiple media sources located on multiple computing devices.

Interface: The junction between a user and a computer program providing commands or menus through which a user communicates with the program. The term user in this context represents generally any individual or mechanism desiring to communicate with the program. For example, in the client-server model defined above, the server usually generates and delivers to a client an interface for communicating with a program operating on or controlled by the server device. Where the server is a web server, the interface is a web page. The web page when displayed by the client device presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

Introduction: In distributed computing environments, a user employs a client device to access a particular application running on a server device. The user directs the application to manipulate electronic data found in a data store located anywhere on a computer network. To do so, the user must provide the application with the information required to locate and access the data store. It is expected, that various embodiments of the present invention will enable the provision of this information with minimal user interaction and without requiring additional programming for the client device while helping to protect the user's privacy.

Although the various embodiments of the invention disclosed herein will be described with reference to the computer network 10 shown schematically in FIG. 1, the invention is not limited to use with network 10. The invention may be implemented in or used with any computer system in which it is necessary or desirable to access electronic data. The following description and the drawings illustrate only a few exemplary embodiments of the invention. Other embodiments, forms, and details may be made without departing from the spirit and scope of the invention, which is expressed in the claims that follow this description.

Referring to FIG. 1, computer network 10 represents generally any local or wide area network in which a variety of different electronic devices are linked. Network 10 includes application server devices 12, client devices 14, data storage devices 16, and identification server device 18. Application server devices 12 contain programming for managing and distributing software-based applications. Client devices 14, typically computer workstations, contain programming capable of communicating with application server devices 12 and providing a user interface for directing the software based services managed by application server devices 12. Data storage devices 16 manage and distribute electronic data contained in one or more data stores. Identification server device 18 contains programming enabling application server devices 12 to locate and access data from data storage devices 16.

Link 20 interconnects devices 12–18 and represents generally a cable, wireless, or remote connection via a telecommunication link, an infrared link, a radio frequency link, or any other connector or system that provides electronic communication between devices 12–18. Link 20 may represent an intranet, an Internet, or a combination of both. Devices 12–18 can be connected to the network 10 at any point and the appropriate communication path established logically between the devices.

Figure 2:
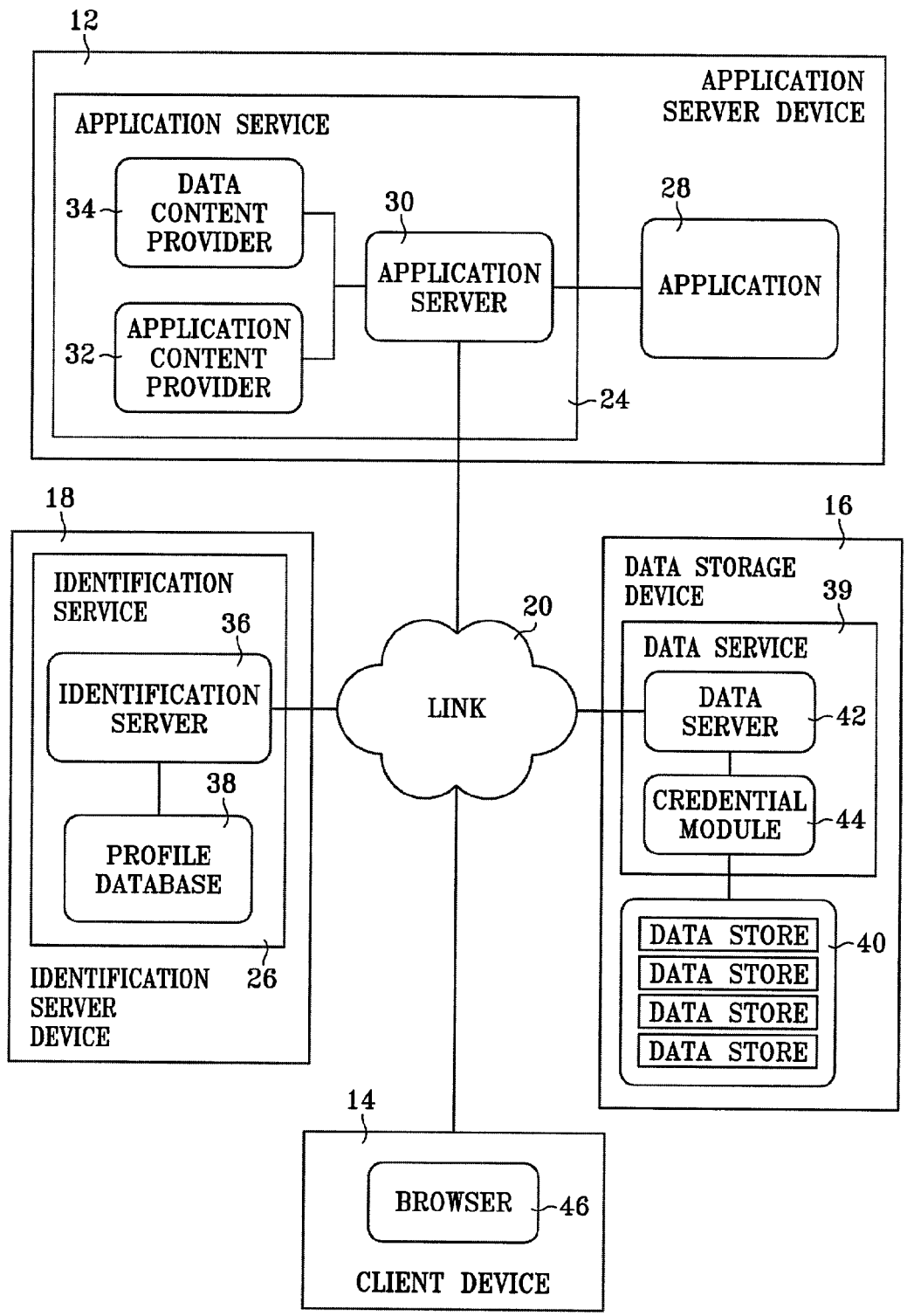
FIG. 2 is a block diagram of the network of FIG. 1 illustrating the logical program components operating on each device enabling data access according to one embodiment of the present invention.

Components: The logical components of one embodiment of the invented data access system will now be described with reference to the block diagram of FIG. 2. In FIG. 2, the invention is embodied in software or other programming labeled as application service 24 running on application server device 12 and identification service 26 running on identification server device 18. Application service 24 represents a network resource, programming, capable of providing client device 14 access to application 28. Identification service 26 represents generally any programming capable of providing application service 24 access to data on data storage devices 16. Application 28 represents any program capable of performing a specified function or functions. It is expected that application 28 will function, at least in part, by manipulating or using data stored on data storage device 16. For example, application 28 may direct a printer to print an electronic document stored on data storage device 16. Application service 24, in other words, provides an interface between client device 14 and application 28, while identification service 26 provides an interface between application service 24 and data storage device 16.

Application service 24 includes application server 30, application content provider 32, and data content provider 34. Application server 30 represents programming capable of receiving requests from client device 14 to access application 28 and returning an appropriate interface. Application content provider 32 is programming responsible for generating electronic data (content) for directing application 28. Data content provider 34 is programming responsible for generating electronic data (content) used by client device 14 for selecting, manipulating or otherwise controlling data found on data storage device 16. Although data content provider 34 is shown as being located on Application server device 12, it may also be located on data storage device 16.

Identification service 26 includes identification server 36 and profile database 38. Identification server 36 represents programming capable of receiving and responding to communications from application server device 12 and in some instances client device 14 as well as managing profile database 38. Profile database 38 represents memory containing user profiles. User profiles are electronic records containing data required to identify a user's electronic files on data storage device 16.

Data storage device 16 includes data service 39 and data stores 40. Data service 39 represents a network resource, programming, capable of managing and distributing data contained in data stores 40. As illustrated, data service 39 includes data server 42 and credential module 44. Data server 42 represents any programming capable of receiving and acting on requests for electronic files contained in data stores 40. Typically, each data store 40 will be assigned to a particular user, providing that user with a storage area for electronic files. Multiple users may share a single data store 40, and a single user may have access to multiple data stores 40. Credential module 44 represents programming capable of limiting access to data stores 40. For security and privacy reasons, credential module 44 may require a user to supply credentials such as a user name and password in order to access one or more data stores 40. Data stores 40 may also be encrypted and the credentials may also include a decryption key. It is expected then that each user profile in profile database 38 will contain credentials required by credential module 44 to obtain access to a particular data store 40.

Application server 30, identification server 36, and data server 42 are expected to be web servers hosting web pages or web services. To access a web page or service, client device 14 includes web browser 46 or other similar programming.

To identify data service 39, a profile will include the static credentials needed to access data service 39. For example, the static credentials may be represented by the following URL—www.datastore.net/ref?=user-name:password. The portion "www.datastore.net" represents the network address used to locate data server 42. The portion "ref=username: password" represents credentials used to identify and/or access a particular data store 40. It is expected that two types of credentials will be utilized to access data service 39—static and temporary. Static credentials will be used by identification service 26 to identify data service 39 while application service 24 will use temporary credentials to access service 39. To protect a user's privacy, temporary credentials used to access data service 39 will typically be invalidated following a termination event. Termination events can involve application service 24 accessing data service 39, the occurrence of a given number of uses, and/or the lapse of a set time period. Application service 24 then must acquire new temporary credentials to access data service 39 in the future. This will help prevent application server 24 from accessing data service without the user's knowledge or consent. It also helps prevent application service 24 from tracking the number of times it accesses data service 39 and, thus, helps prevent application service 24 from tracking the activities of a particular user.

Figure 3:
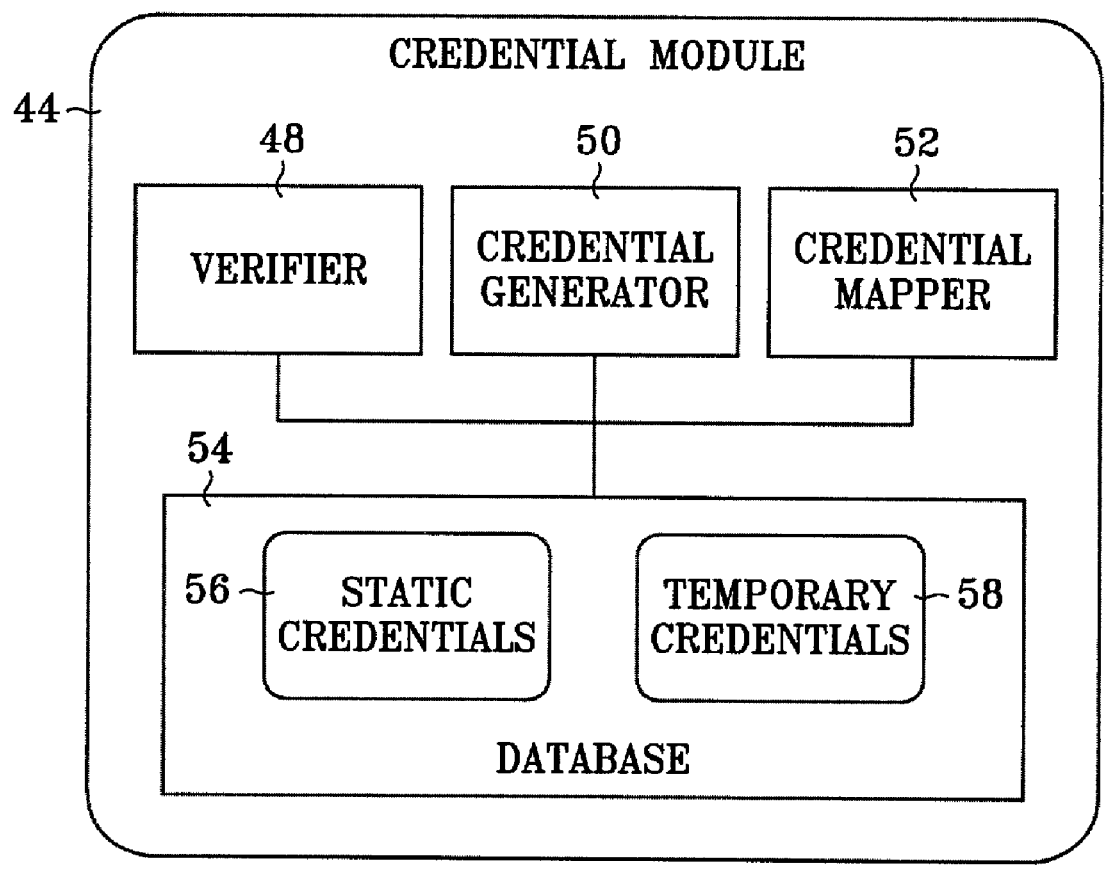
FIG. 3 is a block diagram illustrating the logical components of the credential module.

FIG. 3 illustrates the logical components of credential module 44. Credential module 44 includes verifier 48, credential generator 50, credential mapper 52, and database 54. Database 54 represents generally any memory containing static credentials 56 and temporary credentials 58. Verifier 48 represents generally any programming capable of confirming that credentials provided by application service 24 and identification service 26 are found in database 54. Credential generator 50 represents generally any programming capable of generating and invalidating temporary credentials while credential mapper 52 represents generally any programming capable of mapping temporary credentials generated by credential generator 50 to data service 39 identified by static credentials supplied by identification service 26. Invalidating may involve deleting the temporary credentials from database 54, or it may involve associating the temporary credentials with a counter or timer that cause the temporary credentials to expire after a given number of uses or a given period of time. Verifier 48 then includes programming for detecting the expiration of temporary credentials.

The block diagrams of FIGS. 2 and 3 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function (s). While application service 24, identification service 26, and browser 46 are shown as operating on separate devices 12, 14, and 18, two or even all three may operate on a single device. Moreover, components of application service 24 may be found on more than one device. The same is true for identification service 26 and credential module 44.

Also, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programs and data for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Operation: The operation of the invented data access method will now be described with reference to the flow diagrams of FIG. 4 and the exemplary screen view of FIG. 5. An initial step involves establishing a profile for a user on identification service 26 (step 60). It is assumed that the user has an assigned data store 40, managed by data service 39 that can be accessed through a network address using credentials such as a username and password pair or a decryption key. Using browser 46, the user accesses identification server 36 which returns a web page providing an interface (profile interface) for the user to supply the network address of data service 39 and the user's credentials, if required, to access the user's data store 40. Browser 46 returns the supplied information to identification server 36 which in turn creates a profile for the user in profile database 38. Identification server 36 returns profile data to browser 46. Profile data is associated with and used to locate a particular profile, in this case the profile created in step 60. Profile data may be information such as a username and password the user has to remember in order to later access the created profile. Alternatively, profile data may take the form of a cookie. A cookie is a message given to a browser by a web server. The browser stores the message in a text file. The message is then sent back to the server each time the browser sends a request to that particular web server.

Using browser 46, the user can then request access to application 28 through application server 30 (step 62). Typically this involves browsing to a network address established for application server 30. In response, application server 30 directs browser 46 to provide identification service 26 with profile data (step 64). Application server 30 generates or otherwise provides an interface containing instructions for browser 46 to request and display application content and to request and display data content (step 66). Application server 30 then returns the interface to browser 46. Browser 46 opens the interface (step 68), requests the application and data content (step 70).

Step 64 may be accomplished in a number of ways. Application server 30 may redirect browser 46 to the network address for identification service 26. Browser 46 then requests access to identification server 36. In response identification server 36 may generate and return an interface enabling the user to manually provide profile data. However, where the profile data is stored as a cookie, identification server 36 automatically retrieves the profile data following the request. Identification server then redirects browser 46 back to application server 30 to complete step 66.

Alternatively, application 30 may include in the interface provided in step 66 instructions to send profile data to identification service 26. Where the interface is a web page, instructions to send profile data may be instructions for requesting a "web bug" from a network address assigned to identification server 26. A web bug is typically a small image, one pixel in size and is invisible to the user. The image itself usually does not serve a function. However, the request for the image does. When requesting the image, browser 46 sends or makes available the profile data, in this case a cookie stored in step 60, to identification server 36.

Where the profile data is represented by a cookie, typically, identification service 36 retrieves the cookie in response to browser 46 being redirected to identification service 26 or when browser 46 requests the web bug image. Consequently, the action of "sending a cookie" includes identification service 36 retrieving the cookie. Upon receipt of the cookie, identification server 36 retrieves the user's, profile from profile database 38 (step 74) and provides credential module 44 with the retrieved profile (step 76). Step 76 may involve sending the profile directly to credential module 44, or it may involve generating a web page accessible by credential module 44. That web page will include the retrieved profile. Any other programmatic mechanisms (not requiring user intervention) may also be used to convey the user profile information to credential model 44. Optionally, only the relevant portion of the user profile may be sent to credential module 44.

Using the retrieved profile, credential module 44 generates temporary credentials (step 78) for accessing data service 39 and maps those credentials to the user's data store 40 (step 80). Credential module 44 returns the temporary credentials to identification service 26 which in turn provides the temporary credentials to application service 24 (step 82). Step 82 may involve sending the temporary credentials directly to application service 24, or it may involve generating a web page accessible by application service 24. That web page will include the temporary credentials. Any other programmatic mechanism may be used in the conveyance of the temporary credentials back to the application service 24, including conveying the credentials through identification service 26 with which application service 24 already has a relationship. Next, application server 30 accesses data service 39 using the temporary credentials. Credential module 44 verifies those credentials and provides application service 24 with access to the data store 40 mapped to the temporary credentials. Application server 30 accesses the user's data store 40 and directs data content provider 34 to generate data content for selecting electronic files in that data store 40 (step 84). Application server 30 also directs application content provider 32 to generate application content for directing application 28 (step 86). Application server 30 then returns the application and data content to browser 46 (step 88). Finally, browser 46 displays the interface, which now includes the application and data content, allowing a user to direct application 28 and select electronic records in data store 40 (step 90).

The temporary credentials generated in step 78 may provide full or limited access to data service 39 and data store 40. Where access is limited, credential module 44 may only allow data to be read from data store 40 preventing a user from modifying or deleting files. Credential module 44 may limit access to certain types of files contained in data store 40 such as word processing documents or spreadsheets. Credential module 44 may also limit the data it provides relating the files contained in data store 40 such as creation dates, authors, file size and other meta-data. The Credentials could be used as in the example to direct data store 40 to generate web content for execution within a browser, however, the credentials could also be used by application service 24 directly through a programmatic interface exposed by data store 40.

Following a termination event, credential module 44 invalidates the temporary credentials used to gain access. Invalidating may involve an overt act such as deleting the temporary credentials or associating them with a flag indicating that they are no longer valid. Invalidating may also involve rejecting the temporary credentials when presented. Invalidating forces application server 24 to acquire new and different temporary credentials before accessing data store 40 the next time. Providing application service 24 with single static set of credentials to access a particular data store 40 presents a potentially serious but unnecessary security risk. Application service 24 could reuse the credentials without the user's knowledge or consent. Application service 24 could match the static credentials to a particular user and track the activities of that user. This is particularly an issue where the data store is being accessed by multiple services. If the same credentials were being used consistently across a number of services, those services could conspire to learn about the user, thus violating the user's privacy. Only one of these conspiring services would need to learn identification information (name, email address, phone number) in order to associate the user's behavior with an actual human being. Although it is useful to prevent a single application service from getting the same user credentials twice (particularly between sessions), it is even more useful to prevent application services to conspire. Because the same credentials are never used, or at least never consistently used, to access a particular data store 40, the user's privacy is better protected.

It is envisioned that the interface generated in step 64 will be a framed web page. A framed web page is one that divides the browser's display area into two or more sections or frames. The actual content of each frame is not provided by the framed web page itself. Rather, the framed web page provides, for each frame, a network address for accessing content to be displayed in that frame. Consequently, when browser 46 requests access to application 28, application server 30 returns a framed web page that includes a network address for retrieving the application content generated by application content provider 32 and the data content generated by data content provider 34. The instructions to send profile data may be included in the framed web page or in the application content.

Figure 5:
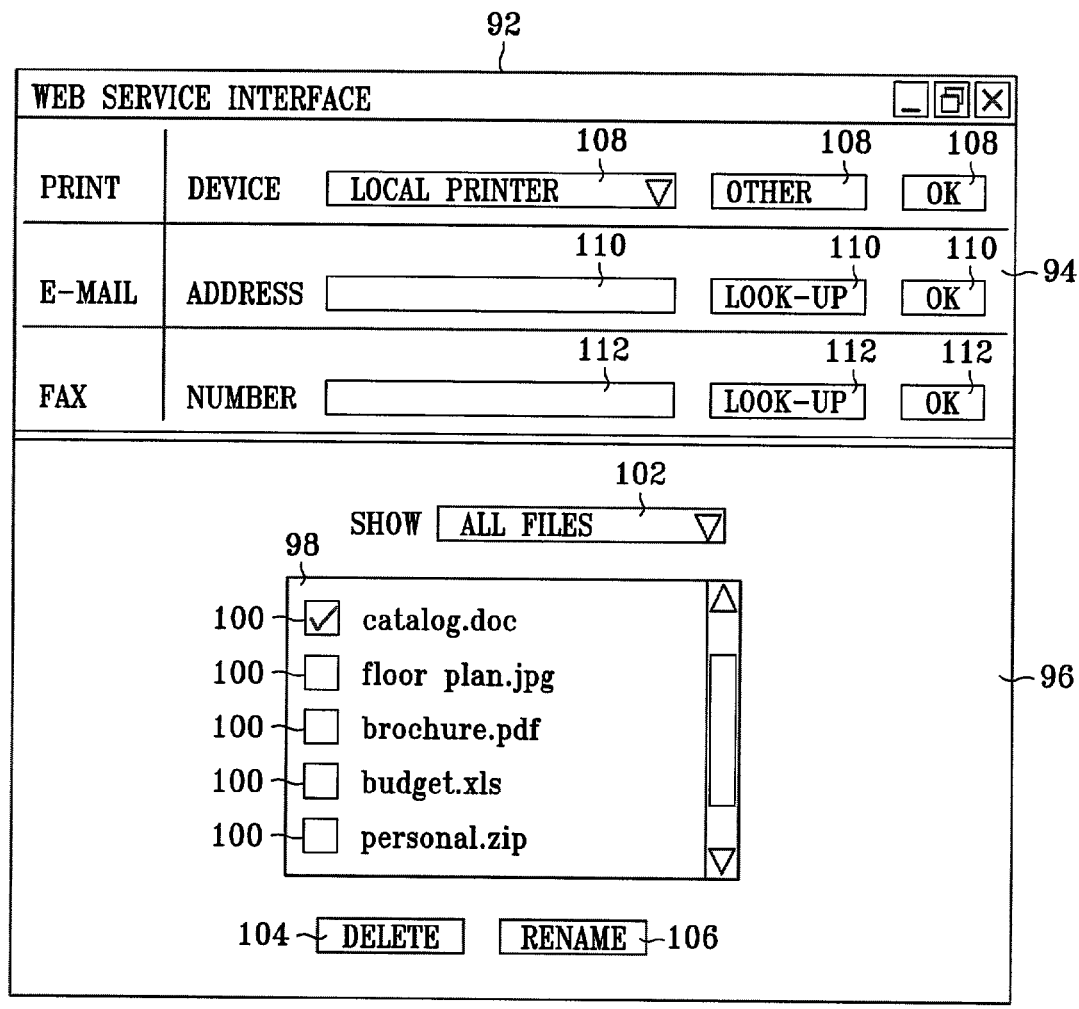
FIG. 5 is an exemplary screen view of an interface providing content for directing an application and content for selecting electronic files from a data service.

FIG. 5 illustrates a screen displaying an interface 92 generated for selecting electronic files in data store 40 and directing application 28. Application 28, in this example, provides document production services such as printing, e-mailing, and faxing. Interface 92 is shown as a framed web page. An example of the application content is shown in frame 94 while an example of a data web page is shown in frame 96.

When generating the data content shown in frame 96, data content provider 34 included a scroll menu 98 displaying each electronic file found in data store 40. In this example scroll menu 98 includes check boxes 100 allowing the user to select one or more of the displayed files. Here, the file "catalog.doc" has been selected. Also included is pull down menu 102 and command buttons 104 and 106. Pull down menu 102 allows a user to select the type of files displayed in scroll menu 98. In this example "all files" is selected. A user may, however, desire to show only word processor documents or spreadsheets. Command buttons 104 and 106 allow a user to perform tasks such as deleting or renaming files selected in scroll window menu 98.

When generating the application content shown in frame 94, application content provider 32 included controls 108-112 for printing, e-mailing, faxing, and archiving a file or files selected in fame 96. Using controls 108, a user can instruct application 28 to print a file or files selected in frame 96. Using controls 110 or 112, the user can instruct application 28 to send the selected file to a particular e-mail address or fax the file to a particular number.

Figure 4:
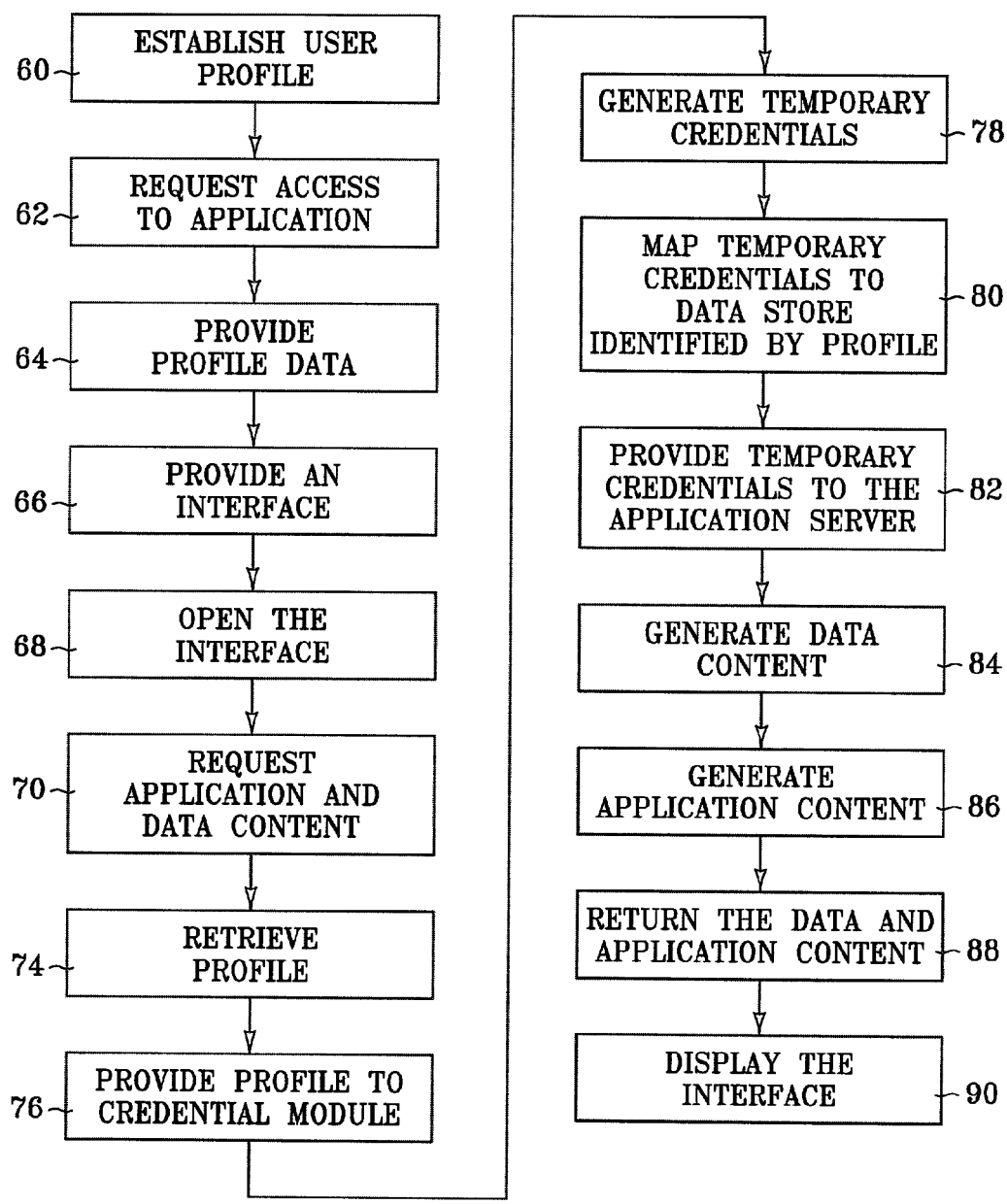
FIG. 4 is a flow diagram illustrating the data access process according to one embodiment of the present invention.

Although the flow chart of FIG. 4 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention. The screen display of FIG. 5 is exemplary only. There exist many possible layout and control configurations for interfaces that will allow a user to direct application 28 while selecting electronic files in data store 40. FIG. 5 merely provides one such example.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A method for providing a first network resource operating on a first network device access to a second network resource operating on a second network device, comprising:
   from a third network device, locating a profile using profile data obtained from a client device, the profile containing data for identifying and for accessing the second network resource;
   from the third network device, supplying the profile to the second network resource;
   at the third network device, receiving temporary credentials for accessing the second network resource and generated according to the profile, the temporary credentials being provided from the second network resource; and
   from the third network device, providing the first network resource with the temporary credentials so that the first network resource can provide the second network resource with the temporary credentials to access and interact with the second network resource on behalf of the client device.

2. The method of claim 1, further comprising the act of invalidating the temporary credentials following a termination event.

3. The method of claim 2, wherein the termination event involves the lapse of a set time period.

4. The method of claim 2, wherein the termination event involves the first network resource accessing the second network resource.

5. The method of claim 1 wherein the temporary credentials provide the first network resource with limited access to the second network resource.

6. A method for enabling an application server to access a data service, the application server operating on a first network device and the data service operating on a second network device, the method comprising:
   the application server instructing a client device to provide profile data to an identification service operating on a third network device, the identification service having access to one or more profiles used to access one or more data services including the data service operating on the second network device, the profile data identifying a particular profile;
   the identification service locating the particular profile using the profile data received from the client device, the profile containing data for identifying and for accessing the data service;
   the identification service providing the profile to the data service;
   the data service generating temporary credentials for accessing the data service identified by the particular profile end providing the temporary credentials to the identification service; and
   the application server obtaining the temporary credentials from the identification service and providing the data service with the temporary credentials to access and interact with the data service on behalf of the client device.

7. The method of claim 6, wherein the act of instructing the client device includes providing a user interface that includes instructions to send profile data to the identification service, and sending the interface to the client device.

8. The method of claim 6, wherein the act of instructing the client device comprises redirecting the client device to the identification service.

9. The method of claim 6, further comprising the act of invalidating the temporary credentials following a termination event.

10. The method of claim 6, wherein the act of generating temporary credentials comprises generating temporary credentials that provide limited access to the data service.

11. The method of claim 6, further comprising the application server generating a framed web page having a first frame and a second frame, and providing, for the first frame, content for directing an application, and providing, for the second frame, content for selecting one or more electronic files managed by the data service identified by the particular profile.

12. The method of claim 11, further comprises the client device sending a cookie identifying the particular profile upon opening the framed web page.

13. The method of claim 11, wherein the act of generating an interface includes generating an interface that includes instructions to request a web bug from the identification service, the method further comprising the client device requesting the web bug, the request including a cookie identifying the particular profile.

14. A method for enabling an application server to access a data service, the application server operating on a first network device and the data service operating on a second network device, the method comprising: the application server receiving, from a client device, a request to direct an application;

the application server instructing the client device to provide profile data to an identification service operating on a third network device, the identification service having access to one or more profiles for identifying and accessing one or more data services, the profile data identifying a particular profile;

the identification service providing the data service with the particular profile identified by the profile data, the profile containing data for identifying and accessing the data service;

the data service using the profile to generate temporary credentials for accessing the data service and providing the temporary credentials to the identification service; and the application server obtaining the temporary credentials from the identification service and providing the data service with the temporary credentials to access and interact with the data service on behalf of the client device.

15. The method of claim 14, wherein the act of instructing the client device includes generating a user interface that includes instruction to send profile data to the identification service, and sending the interface to the client device.

16. The method of claim 14, wherein the act of instructing the client device comprises redirecting the client device to the identification service.

17. The method of claim 14, further comprising the act of invalidating the temporary credentials following a termination event.

18. The method of claim 14, wherein the act of using the profile to generate temporary credentials comprises generating temporary credentials that provide limited access to the data service.

19. The method of claim 14, further comprising the application server generating a framed web page having a first frame and a second frame, the method further comprising providing, for the first frame, content for directing an application, and providing, for the second frame, content for selecting one or more electronic files managed by the data service identified by the particular profile.

20. The method of claim 19, wherein the act of generating the framed web page includes generating a framed web page that includes instructions to request a web bug from the identification service, and wherein the act instructing the client device includes the client device requesting the web bug upon opening the framed web page, the request including a cookie identifying the particular profile.

21. A computer readable medium having instructions for:
from a third network device, locating a profile using profile data obtained from a client device, the profile containing data for identifying and for accessing a second network resource operating on a second network device;
from the third network device, supplying the profile to the second network resource;
at the third network device receiving temporary credentials for accessing the second network resource and generated according to the profile, the temporary credentials being provided from the second network resource; and from the third network device, providing a first network resource operating on a first network device with the temporary credentials so that the first network resource can provide the second network resource with the temporary credentials to access and interact with the second network resource on behalf of the client device.

22. The medium of claim 21, further having instructions for invalidating the temporary credentials following a termination event.

23. The medium of claim 22, wherein the termination event involves the lapse of a set period of time.

24. The medium of claim 22, wherein the termination event involves the first server accessing the second server.

25. The medium of claim 21, wherein the temporary credentials provide limited access to the second network resource.

26. A computer readable medium having instructions for:
from a first network device, instructing a client device to provide profile data to an identification service operating on a third network device, the identification service having access to one or more profiles used to access one or more data services, the profile data identifying a particular profile;
from the third network device, locating the particular profile using the profile data obtained from the client device, the profile containing data for identifying and for accessing a data service operating on a second network device;
from the second network device, generating temporary credentials for accessing the data service identified by the particular profile and providing the temporary credentials to the third network device; and
at the first network device, obtaining the temporary credentials from the third network device and providing the data service with the temporary credentials to access and interact with the data service operating on a second network device on behalf of the client device.

27. The medium of claim 26, wherein the instructions for instructing the client device include instructions for generating a user interface that includes instruction to send profile data to the identification service, and sending the interface to the client device.

28. The medium of claim 26, wherein the instructions for instructing the client device comprise instructions for redirecting the client device to the identification service.

29. The medium of claim 26, wherein the instructions for generating temporary credentials comprise instructions for generating temporary credentials that provide limited access to the data service.

30. The medium of claim 26, having further instructions for generating a framed web page having a first frame and a second frame and providing, for the first frame, content for directing an application, and providing, for the second frame, content for selecting one or more electronic files managed by the accessed data service.

31. The medium of claim 30, wherein the instructions for generating the framed web page include instructions for generating a framed web page that includes instructions to request a web bug from the identification service, the request to include a cookie identifying the particular profile.

32. A computer readable medium having instructions for generating, at a third network device, a profile interface having user accessible controls for creating a profile for locating and accessing a data service operating on a second network device;

from the third network device, creating a profile according to selections made through the profile interface, the profile containing data for identifying and accessing the data service;

from the third network device, providing a client device with profile data identifying a created profile;

receiving, at a first network device, a request to access an application;

from the first network device, instructing a client device to send profile data;

receiving the profile data at the third network device;

from the third network device, retrieving a profile identified by the profile data;

generating, at the second network device, temporary credentials for accessing a data service identified by the retrieved profile and providing the temporary credentials to the third network device; and at the first network device, obtaining the temporary credentials from the third network device and providing the data service with the temporary credentials to access and interact with the data service on behalf of the client device.

33. The medium of claim 32, wherein the instructions for instructing the client device include instructions for generating a user interface that includes instruction to send profile data, and sending the interface to the client device.

34. The medium of claim 32, wherein the instructions for instructing the client device comprise instructions for redirecting the client device.

35. The medium of claim 32, wherein the instructions for generating temporary credentials comprise instructions for generating temporary credentials that provide limited access to the data service.

36. The medium of claim 32, having further instructions for generating a framed web page having a first frame and a second frame, the medium having further instructions for providing, for the first frame, content for directing the application, and providing, for the second frame, content for selecting one or more electronic flies managed by the accessed data service.

37. The medium of claim 36, wherein the instructions for providing a client device with profile data comprise instructions for providing the client device with a cookie, and wherein the instructions for generating the framed web page include instructions for generating a framed web page that includes instructions to request a web bug from the identification service, the request to include the cookie.

38. A system for providing a first network resource operating on a first network device with access to a second network resource operating on a second network device, comprising: an identification service operating on a third network device, the identification service in network communication with a credential module, the credential module operating on the second network device and operable to use a profile acquired by the identification service to generate temporary credentials for accessing the second network resource, the identification service being operable to receive profile data from a client device and to acquire a profile identified by the profile data, the credential module and the identification service, together being operable to provide the first network resource with the temporary credentials enabling the first network resource to provide the second network resource with the temporary credentials to access and interact with the second network resource on behalf of the client device.

39. The system of claim 38, wherein the credential module is further operable to invalidate the temporary credentials following a termination event.

40. The system of claim 39, wherein the termination event involves the lapse of a set time period.

41. The system of claim 39, wherein the termination event involves the first server accessing the second server.

42. The system of claim 38, wherein the credential module is further operable to generate temporary credentials that provide limited access to the second network resource.

43. A system for accessing a data service operating on a second network device comprising:

an identification service, operating on a third network device, operable to receive profile data from a client device identifying a particular profile and to provide that profile, the profile to contain electronic data used to identify the data service;

a credential module, operating on the second network device, operable to obtain the profile from the identification service, generate temporary credentials, and map those credentials to the data service identified by the profile and to provide the temporary credentials to the identification service; and an application server, operating on a first network device, operable to serve an interface containing instructions to send profile data to the identification service, to obtain the temporary credentials from the identification service, and to provide the data service with the temporary credentials to access and interact with the data service on behalf of the client device.

44. The system of claim 43, wherein the credential module is further operable to invalidate the temporary credentials following a termination event.

45. The system of claim 43, further comprising:

an application content provider in communication with the application server and operable to generate content for directing an application; and a data content provider in communication with the application server and operable to generate content for selecting electronic files managed by the accessed data service.

46. The system of claim 45, wherein the application server is operable to create the interface in the form of a framed web page having a first frame for displaying the content generated by the application content provider and a second frame for displaying the content generated by the data content provider, the framed web page also including instructions to request a web bug from the identification service, the request to include the profile data.

47. The system of claim 45, further comprising a web browser operable to request and display the interface in the form of the framed web page and to request the web bug providing the profile data to the identification service.

48. A system for accessing a data service operating on a second network device, the system comprising:

an identification service operating on a third network device and operable to generate a profile interface having user accessible controls for creating a profile containing electronic data used to identify the data service, to create a profile using selections made through the profile interface, to issue instructions to store profile data used to access the created profile, to receive, from a client device, profile data identifying a particular profile, and to provide that profile;

a credential module operable to obtain the profile from the identification service, generate temporary credentials, and map those credentials to the data service identified by the profile and to provide the temporary credentials to the identification service; and an application server operating on a first network device and operable to serve an application interface that includes instructions to send profile data to the identification service, to obtain the temporary credentials from the identification service, and to provide the data service with the temporary credentials to access and interact with the data service on behalf of the client device.

49. The system of claim 48, wherein the credential module is further operable to invalidate the temporary credentials following a termination event.

50. The system of claim 48, further comprising:

an application content provider in communication with the application server and operable to generate application content for directing an application; and a data content provider in communication with the application server and operable to generate data content for selecting electronic files, managed by the accessed data service.

51. The system of claim 50, wherein the application server is operable to create the application interface in the form of a framed web page having a first frame for displaying the content generated by the application content provider and a second frame for displaying the content generated by the data content provider, the framed web page also including instructions to request a web bug from the identification service, the request to include the profile data.

52. The system of claim 48, further comprising a browser operable to request and display the profile and application interfaces.

* * * * *

UNITED STATES PATENT AND TRADEMARK OFFICE
CERTIFICATE OF CORRECTION

| | |
|---|---|
| PATENT NO. | : 7,149,806 B2 |
| APPLICATION NO. | : 10/085971 |
| DATED | : December 12, 2006 |
| INVENTOR(S) | : Gregory Eugene Perkins et al. |

It is certified that error appears in the above-identified patent and that said Letters Patent is hereby corrected as shown below:

In column 10, line 9, in Claim 5, after "claim 1" insert -- , --.

In column 10, line 31, in Claim 6, delete "end" and insert -- and --, therefor.

In column 12, line 63, in Claim 32, after "for" insert -- : --.

In column 13, line 41, in Claim 36, delete "flies" and insert -- files --, therefor.

Signed and Sealed this

Eleventh Day of August, 2009

David J. Kappos
*Director of the United States Patent and Trademark Office*